United States Patent
Nakagawa et al.

(10) Patent No.: US 11,485,355 B2
(45) Date of Patent: Nov. 1, 2022

(54) PARKING ASSIST APPARATUS

(71) Applicant: TOYOTA JIDOSHA KABUSHIKI KAISHA, Toyota (JP)

(72) Inventors: Takuya Nakagawa, Nagoya (JP); Yuki Minase, Toyota (JP); Junji Horiguchi, Nagoya (JP); Norio Imai, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 227 days.

(21) Appl. No.: 17/028,423

(22) Filed: Sep. 22, 2020

(65) Prior Publication Data
US 2021/0107463 A1    Apr. 15, 2021

(30) Foreign Application Priority Data
Oct. 11, 2019 (JP) .............................. JP2019-187788

(51) Int. Cl.
*B60W 30/06* (2006.01)
*G06V 20/58* (2022.01)

(52) U.S. Cl.
CPC .......... *B60W 30/06* (2013.01); *G06V 20/586* (2022.01)

(58) Field of Classification Search
CPC .. B60W 30/06; B62D 15/0285; G06V 20/586
USPC ........................................................ 701/27
See application file for complete search history.

(56) References Cited

U.S. PATENT DOCUMENTS

| | | | |
|---|---|---|---|
| 2017/0297565 A1* | 10/2017 | Joyce | B60K 28/10 |
| 2020/0122707 A1* | 4/2020 | Jost | B60W 10/06 |
| 2020/0290640 A1* | 9/2020 | Schuller | B60W 60/001 |

FOREIGN PATENT DOCUMENTS

JP    2007-118804 A    5/2007

* cited by examiner

*Primary Examiner* — Peter D Nolan
*Assistant Examiner* — Luke Huynh
(74) *Attorney, Agent, or Firm* — Sughrue Mion, PLLC

(57) ABSTRACT

The parking assist apparatus comprises a first vehicle stop apparatus operated for a purpose of stopping a vehicle, a controller configured to be capable of performing parking assist control for parking a vehicle in a parking position and to finish the parking assist control by performing control for instructing a driver of the vehicle to operate the first vehicle stop apparatus or by controlling the first vehicle stop apparatus, and a second vehicle stop apparatus operated for a purpose of stopping the vehicle. When it is determined while the parking assist control is being performed that there is a malfunction in an apparatus for detecting whether or not operation of the first vehicle stop apparatus has been performed, the controller is configured to finish the parking assist control by performing control for instructing the driver to operate the second vehicle stop apparatus or by controlling the second vehicle stop apparatus.

2 Claims, 8 Drawing Sheets

PARKING ASSIST APPARATUS

TECHNICAL FIELD

The present invention relates to a parking assist apparatus for performing at least one of following controls as parking assist control, one control being for automatically parking a vehicle in a parking position, and an other control being for assisting in parking the vehicle in the parking position.

BACKGROUND ART

Japanese Patent Application Laid-Open (kokai) No. 2007-118804 discloses a driving support apparatus (hereinafter, referred to as a "conventional apparatus") configured to perform, as parking assist control, control for automatically parking a vehicle in a parking position set on a region where parking is determined to be possible based on a captured image taken by an imaging apparatus.

The conventional apparatus sets a brake pedal operation by a driver of the vehicle as a condition for cancelling (finishing) the parking assist control and is configured to finish the parking assist control at a timing when this brake pedal operation has been detected.

SUMMARY OF THE INVENTION

According to a configuration of the conventional apparatus, when there is a malfunction in an apparatus (a master cylinder pressure sensor and a stroke sensor, for instance) for detecting whether or not brake pedal operation has been performed (conducted), the brake pedal operation cannot be property detected, and thus there is a possibility that the parking assist control cannot be properly finished. That is, when there is a malfunction in an apparatus for detecting whether or not operation of some apparatus (the brake pedal in an example of the conventional apparatus) requested to be operated in order to finish the parking assist control has been performed, there is a possibility that the parking assist control cannot be property finished.

The present invention is made to resolve the problem above. That is, one of objects of the present invention is to provide a parking assist apparatus (hereinafter, referred to as a "present invention apparatus") capable of properly finishing the parking assist control even if there is a malfunction in an apparatus for detecting whether or not operation of some apparatus requested to be operated in order to finish the parking assist control has been performed.

A present invention apparatus comprising:
an imaging apparatus (21) for taking an image of a surrounding of a vehicle (SV);
a first vehicle stop apparatus (42, 72, 121, 72) configured to be operated for a purpose of stopping the vehicle (SV);
a controller (10) configured to:
  be capable of performing at least one of following controls as parking assist control, one control being for automatically parking the vehicle (SV) in a first parking position or in a second parking position, the first parking position being set on a region where parking is determined to be possible based on at least a captured image taken by the imaging apparatus (21), and the second parking position being registered in advance using the captured image, and an other control being for assisting in parking the vehicle (SV) in the first parking position or in the second parking position, and
  finish the parking assist control by performing control for instructing a driver of the vehicle (SV) to operate the first vehicle stop apparatus (42) or by controlling the first vehicle stop apparatus (72, 121, 72); and
  a second vehicle stop apparatus (72, 42, 42, 121) different from the first vehicle stop apparatus (42, 72, 121, 72) configured to be operated for a purpose of stopping the vehicle (SV).

When it is determined while the parking assist control is being performed that there is a malfunction in an apparatus (41, 110(111), 120, 110(111)) for detecting whether or not operation of the first vehicle stop apparatus (42, 72, 121, 72) has been performed (S225: No, S420: No, S620: No, S815: No), the controller (10) is configured to finish the parking assist control by performing control for instructing the driver to operate the second vehicle stop apparatus (72, 42, 42) or by controlling the second vehicle stop apparatus (121).

The first vehicle stop apparatus is an apparatus which the driver is requested to operate or the controller is required (requested) to control in order to finish (discontinue) the parking assist control. According to a configuration of the present invention apparatus, when it is determined that there is a malfunction in an apparatus for detecting whether or not operation of this first vehicle stop apparatus has been performed, the second vehicle stop apparatus is operated by the driver or is controlled by the controller and thereby the parking assist control is finished. That is, the second vehicle stop apparatus functions as an alternative apparatus for stopping the vehicle when there is a malfunction in the apparatus for detecting whether or not the operation of the first vehicle stop apparatus has been performed. Therefore, even when a malfunction occurs in the apparatus for detecting whether or not the operation of the first vehicle stop apparatus has been performed, the parking assist control can be properly finished by making use of the second vehicle stop apparatus.

In addition, according to this configuration, when it is determined that there is a malfunction in an apparatus for detecting whether or not operation of the first vehicle stop apparatus has been performed, the control for instructing the driver to operate the second vehicle stop apparatus is performed. Therefore, it becomes possible to properly notify the driver of what kind of operation is requested in order to finish the parking assist control.

In another aspect of the present invention,
when it is determined while the parking assist control is being performed that there is a malfunction in a related apparatus used for the parking assist control (S215: Yes, S410: Yes, S610: Yes, S805: Yes), the controller (10) is configured to finish the parking assist control by performing control for instructing the driver to operate the first vehicle stop apparatus (42) or by controlling the first vehicle stop apparatus (72, 121, 72).

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

First Embodiment

<Configuration>

Figure 1:
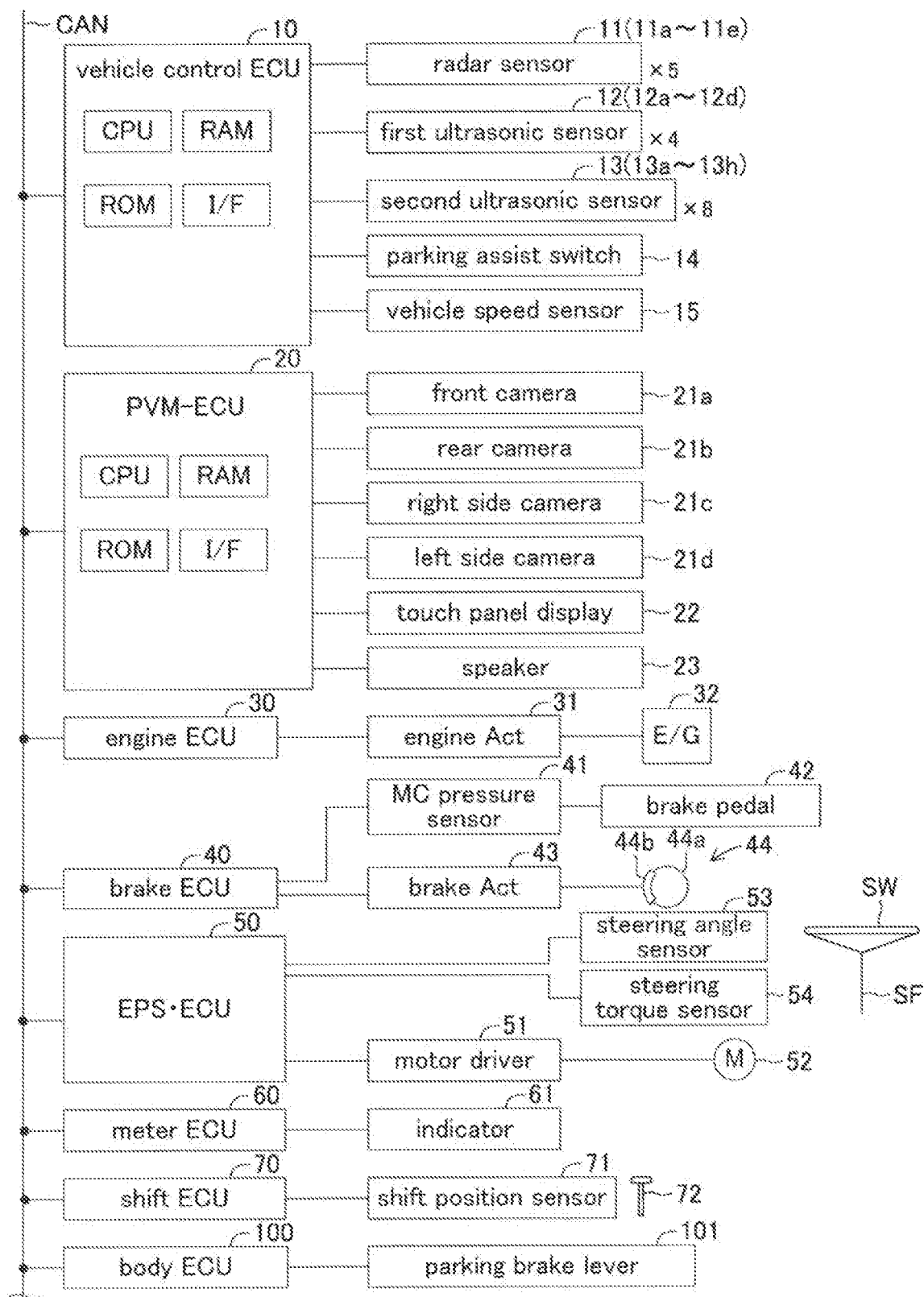
FIG. 1 is a schematic configuration diagram of a parking assist apparatus according to a first embodiment of the present invention.

A parking assist apparatus according to a first embodiment of the present invention (hereinafter, referred to as a "first embodiment apparatus") is applied to a vehicle SV. As shown in FIG. 1, the first embodiment apparatus comprises vehicle control ECU 10, PVM (Panoramic View Monitor)-ECU 20, engine ECU 30, brake ECU 40, EPS•ECU 50, meter ECU 60, shift ECU 70, and body ECU 100. Hereinafter, the vehicle control ECU 10 may be also simply referred to as "VC (Vehicle Control) ECU".

Each ECU includes a microcomputer. This microcomputer includes CPU, ROM, RAM, readable/writable non-volatile memory, interfaces, and the like. The CPU realizes (performs) various functions (mentioned later) by executing instructions (i.e. programs, routines) stored in the ROM. Further, these ECUs are connected to each other in such a manner that they can mutually exchange data (communicate) via a CAN (Controller Area Network). Therefore, detected values etc. of sensors (including switches) connected to a specific ECU may be transmitted to other ECUs.

Radar sensors 11a to 11e, first ultrasonic sensors 12a to 12d, second ultrasonic sensors 13a to 13h, a parking assist switch 14 and a vehicle speed sensor 15 are connected to the VCECU.

It should be noted that when there is no need to distinguish the radar sensors 11a to 11e from each other, they will be referred to as a "radar sensor 11". Similarly, when there is no need to distinguish the first ultrasonic sensors 12a to 12d from each other, they will be referred to as a "first ultrasonic sensor 12". When there is no need to distinguish the second ultrasonic sensors 13a to 13h from each other, they will be referred to as a "second ultrasonic sensor 13".

The radar sensor 11 is a well-known sensor making use of radio wave in a millimeter waveband. The radar sensor 11 acquires object information identifying a distance between a vehicle SV and a three-dimensional object, a relative speed of the three-dimensional object with respect to the vehicle SV, a relative position (direction) of the three-dimensional object with respect to the vehicle SV, and the like and outputs the object information to the VCECU.

Each of the radar sensors 11a to 11e is arranged at a predetermined position of the vehicle SV and acquires the object information of a three-dimensional object existing in a predetermined region described below.

The radar sensor 11a acquires the object information of a three-dimensional object existing in a right front region of the vehicle SV.

The radar sensor 11b acquires the object information of a three-dimensional object existing in a front region of the vehicle SV.

The radar sensor 11c acquires the object information of a three-dimensional object existing in a left front region of the vehicle SV.

The radar sensor 11d acquires the object information of a three-dimensional object existing in a right rear region of the vehicle SV.

The radar sensor 11e acquires the object information of a three-dimensional object existing in a left rear region of the vehicle SV.

Each of the first ultrasonic sensor 12 and the second ultrasonic sensor 13 is a well-known sensor making use of ultrasonic wave. When there is no need to distinguish the first ultrasonic sensor 12 and the second ultrasonic sensor 13 from each other, they will be collectively referred to as an "ultrasonic sensor".

The ultrasonic sensor transmits ultrasonic wave to a predetermined area, receives reflected wave reflected from a three-dimensional object, and detects, based on a time from a timing of transmission to a timing of reception, whether or not a three-dimensional object exists as well as a distance to the three-dimensional object. The first ultrasonic sensor 12 is used to detect a three-dimensional object positioned at a relatively farther position from the vehicle SV, compared to the second ultrasonic sensor 13. Each of the first ultrasonic sensor 12 and the second ultrasonic sensor 13 is arranged at a predetermined position of a vehicle body of the vehicle SV.

The first ultrasonic sensor 12 (12a to 12d) acquires a distance between the first ultrasonic sensor 12 and a three-dimensional object existing in a predetermined region (a detection region) described below, and transmits information on the acquired distance to the VCECU.

A detection region of the first ultrasonic sensor 12a is a front right region of the vehicle SV.

A detection region of the first ultrasonic sensor 12b is a front left region of the vehicle SV.

A detection region of the first ultrasonic sensor 12c is a rear right region of the vehicle SV.

A detection region of the first ultrasonic sensor 12d is a rear left region of the vehicle SV.

The second ultrasonic sensor 13 (13a to 13h) acquires a distance between the second ultrasonic sensor 13 and a three-dimensional object existing in a predetermined region (a detection region) described below, and transmits information on the acquired distance to the VCECU.

A detection region of each of the second ultrasonic sensors 13a to 13d is a front region of the vehicle SV.

A detection region of each of the second ultrasonic sensors 13e to 13h is a front region of the vehicle SV.

The parking assist switch 14 is a switch operated (pressed) by a driver and is operated in order to activate a parking assist system for performing parking assist control. When the parking assist switch 14 is operated again in a midst of the parking assist control being performed after the parking assist system is activated, a signal indicating that the driver has an intention to finish (discontinue) the parking assist control is transmitted to the VCECU. The VCECU can determine, based on a signal transmitted from the parking assist switch 14, whether or not the driver has an intention to finish the parking assist control (whether or not discontinuation of the parking assist control is being requested by the driver).

The vehicle speed sensor 15 is configured to detect a vehicle speed of the vehicle SV and output a signal indicating the vehicle speed. It should be noted that the vehicle speed sensor 15 is, strictly speaking, a wheel speed sensor arranged at each of four wheels of the vehicle SV. The VCECU is configured to acquire a speed of the vehicle SV (a vehicle speed) based on a wheel speed of each wheel detected by the vehicle speed sensor 15 (the wheel speed sensor).

A front camera 21a, a rear camera 21b, a right side camera 21c, and a left side camera 21d are connected to the PVM-ECU 20. Hereinafter, when there is no need to distinguish these cameras 21a to 21d from each other, they will be collectively referred to as a "camera 21". The camera 21 corresponds to one example of an "imaging apparatus".

The front camera 21a is arranged at a substantially central part of a front bumper FB in a vehicle width direction.

The rear camera 21b is arranged on a wall part of a rear trunk RT positioned at a rear part of the vehicle SV. An optical axis of the rear camera 21b is oriented backward of the vehicle SV.

The right side camera 21c is arranged at a right-side door mirror DMR. An optical axis of the right side camera 21c is oriented to a right side of the vehicle SV.

The left side camera 21d is arranged at a left-side door mirror DML. An optical axis of the left side camera 21d is oriented to a left side of the vehicle SV.

An angle of view of the camera 21 is wide-angle. Therefore, an imaging range of the camera 21 includes "right-side, left-side, lower-side, and upper-side ranges" of each of the optical axes. A whole surrounding of the vehicle SV is included in imaging ranges of four cameras 21a to 21d.

The camera 21 takes an image of a surrounding region of the vehicle SV corresponding to the imaging range and acquires image information (image data) every time a predetermined time elapses. The camera 21 transmits the acquired image data to the PVM-ECU 20 and the VCECU.

More specifically, the front camera 21a takes an image of a "front surrounding region of the vehicle SV" corresponding to the imaging range thereof. The front camera 21a transmits to the PVM-ECU 20 the acquired image data (hereinafter, referred to as a "front image data").

The rear camera 21b takes an image of a "rear surrounding region of the vehicle SV" corresponding to the imaging range thereof. The rear camera 21b transmits to the PVM-ECU 20 the acquired image data (hereinafter, referred to as a "rear image data").

The right side camera 21c takes an image of a "right-side surrounding region of the vehicle SV" corresponding to the imaging range thereof. The right side camera 21c transmits to the PVM-ECU 20 the acquired image data (hereinafter, referred to as a "right-side image data").

The left side camera 21d takes an image of a "left-side surrounding region of the vehicle SV" corresponding to the imaging range thereof. The left side camera 21d transmits to the PVM-ECU 20 the acquired image data (hereinafter, referred to as a "left-side image data").

The PVM-ECU 20 generates surrounding image data using the front image data, the rear image data, the right-side image data, and the left-side image data every time the predetermined time elapses. An image displayed (generated) based on the surrounding image data is referred to as a surrounding image. The surrounding image is an image corresponding to at least a part of the range of the surrounding region of the vehicle SV. The surrounding image includes a camera's viewpoint image, a composite image, and the like.

The camera's viewpoint image is an image where a viewpoint is set at a position at which each lens of the camera 21 is arranged.

The composite image is, for example, an image of the surrounding of the vehicle SV seen from a virtual viewpoint set at an arbitrary position around the vehicle SV.

A touch panel display 22 is connected to the PVM-ECU 20. The touch panel display 22 is a touch-panel type display which a non-illustrated navigation apparatus comprises. The PVM-ECU 20 displays the surrounding image on the touch panel display 22 in response to an instruction transmitted from the VCECU.

A speaker 23 is further connected to the PVM-ECU 20. The PVM-ECU 20 commands the speaker 23, in response to an instruction transmitted from the VCECU, to speak operating instruction of each type of the apparatuses.

When the VCECU performs (executes) the parking assist control, the PVM-ECU 20 displays a parking assist image (an operation image) including the surrounding image on the touch panel display 22 in response to an instruction transmitted from the VCECU.

The engine ECU 30 is connected to an engine actuator 31. The engine actuator 31 includes a throttle valve actuator for changing an opening degree of the throttle valve of an engine (a spark ignition type or a fuel injection type of internal combustion engine) 32. The engine ECU 30 drives the engine actuator 31 and thereby can change torque generated by the engine 32. The torque generated by the engine 32 is transmitted to driving wheels via a non-illustrated transmission.

Therefore, the engine ECU 30 controls the engine actuator 31 and thereby can control driving force of the vehicle SV. The VCECU can transmit a driving instruction to the engine ECU 30. When having received the driving instruction, the engine ECU 30 controls the engine actuator 31 in response to this driving instruction. Thus, the VCECU can perform "driving force automatic control" (mentioned later) via the engine ECU 30. It should be noted that when the vehicle SV is a hybrid vehicle, the engine ECU 30 can control driving force of the vehicle SV generated by either one or both of "an engine and a motor" which are serving as a vehicle driving source. Further, when the vehicle SV is an electric vehicle, the engine ECU 30 can control driving force of the vehicle SV generated by a motor which is serving as a vehicle driving source.

The brake ECU 40 is connected to a master cylinder (MC) pressure sensor 41 and a brake actuator 42. The master cylinder pressure sensor 41 is connected to a brake actuator 42. The master cylinder pressure sensor 41 is a sensor for detecting a degree of pedaling force of the brake pedal 42 when the brake pedal 42 is stepped on by the driver (in other words, detecting whether or not operation of the brake pedal 42 has been performed (conducted)). The brake ECU 40 receives a detected value from the master cylinder pressure sensor 41 to determine, based on the detected value, whether or not the operation of the brake pedal 42 has been performed.

The brake actuator 43 is provided in a hydraulic circuit between a non-illustrated master cylinder to compress operating fluid with a pedaling force of the brake pedal 42 and friction brake mechanisms 44 provided at each wheel. Each of the friction brake mechanisms 44 comprises a brake disc 44a fixed to the wheel and a brake caliper 44b fixed to a vehicle body.

The brake actuator 43 adjusts, in response to an instruction from the brake ECU 40, a hydraulic pressure that is supplied to a wheel cylinder which is built in the brake caliper 44b, and operates the wheel cylinder with the hydraulic pressure. Thereby, the brake actuator 41 presses a brake pad onto the brake disc 44a to generate friction braking force. Accordingly, the brake ECU 40 controls the brake actuator 43 and thereby can control the braking force of the vehicle SV. The VCECU can transmit a braking instruction to the brake ECU 40. When having received the braking instruction, the brake ECU 40 controls the brake actuator 43 in response to this braking instruction. Thus, the VCECU can perform "braking force automatic control" (mentioned later) via the brake ECU 40.

The EPS•ECU 50 is a control apparatus of a well-known electrically-driven power steering system and is connected to a motor driver 51. The motor driver 51 is connected to a steered motor 52. The steered motor 52 is incorporated into "steering mechanism including a steering wheel SW, a steering shaft SF, a non-illustrated steering gear mechanism, and the like". The steered motor 52 generates torque with electric power supplied from the motor driver 51 and with the torque, can generate steering assist torque or can turn left-and-right steered wheels. That is, the steered motor 52 can change a steered angle of the vehicle SV.

Further, the EPS•ECU 50 is connected to a steering angle sensor 53 and a steering torque sensor 54. The steering angle sensor 53 is configured to detect a steering angle of the steering wheel SW of the vehicle SV and output a signal indicating the detected steering angle. The steering torque sensor 54 is configured to detect steering torque generated at the steering shaft SF of the vehicle SV by the steering wheel SW being operated and to output a signal indicating the detected steering torque.

EPS•ECU 50 detects, using the steering torque sensor 54, the steering torque which the driver inputs to the steering wheel SW, and drives the steered motor 52 based on this steering torque. The EPS•ECU 50 thereby applies steering torque (steering assist torque) to the steering mechanism, which makes it possible to assist steering operation by the driver.

The VCECU can transmit a steering instruction to the EPS•ECU 50. When having received the steering instruction, the EPS•ECU 50 controls the steered motor 52 based on this steering instruction received. Accordingly, the VCECU can automatically change the steered angle of the steered wheels of the vehicle SV via the EPS•ECU 50 (that is, without the steering operation by the driver). Namely, the VCECU can perform "steered angle automatic control" (mentioned later) via the EPS•ECU 50.

The meter ECU 60 is connected to an indicator 61. The indicator 61 is a multi-information display provided in front of a driver's seat. The indicator 61 displays measured values such as the vehicle speed, engine rotational speed, and the like as well as various types of information.

The shift ECU 70 is connected to a shift position sensor 71. The shift position sensor 71 detects a position of a shift lever 72 serving as a movable part of a shift operation part. In the present embodiment, positions of the shift lever 72 include a parking position (P), a moving forward position (D), and a moving backward position (R). The shift ECU 70 is configured to receive a position of the shift lever 72 from the shift position sensor 71 and control, based on the position received, a non-illustrated transmission and/or a driving direction shifting mechanism of the vehicle SV (that is, perform shift control of the vehicle SV). In the present embodiment, a position of the shift lever 72 is shifted by shifting operation by the driver.

More specifically, when the shift lever 72 is positioned at "P", the shift ECU 70 controls the transmission and/or the driving direction shifting mechanism in such a manner that no driving force is transmitted to driving wheels and the vehicle SV is mechanically locked at a stop position. When the shift lever 72 is positioned at "D", the shift ECU 70 controls the transmission and/or the driving direction shifting mechanism in such a manner that driving force for moving the vehicle SV forward is transmitted to the driving wheels. Further, when the shift lever 72 is positioned at "R", the shift ECU 70 controls the transmission and/or the driving direction shifting mechanism in such a manner that driving force for moving the vehicle SV backward is transmitted to the driving wheels.

A parking brake lever 101 is connected to the body ECU 100. The parking brake lever 101 is operated by the driver for a purpose of locking rear wheels of the vehicle SV via wire. A non-illustrated parking brake sensor is connected to the parking brake lever 101. When the parking brake lever 101 is operated by the driver, this parking brake sensor detects that the parking brake lever 101 has been operated. The body ECU 100 is configured to receive from the parking brake sensor whether or not the operation of the parking brake lever 101 has been performed and to perform, based on whether or not this operation has been performed, control for locking the rear wheels.

The VCECU sets a parking position (a first parking position) in a region where parking is determined to be possible based on the image information (for example, a white line defining a parking space) acquired from the camera 21, the object information (for example, a wall of a building and a fence) acquired from the radar sensor 11, and/or the information on the distance to a three-dimensional object acquired from the ultrasonic sensor. The VCECU thereafter performs control for automatically parking the vehicle SV in this parking position or control for assisting in parking the vehicle SV in this parking position.

In this specification, the "control for automatically parking the vehicle in the parking position" and the "control for assisting in parking the vehicle in the parking position" mentioned above will be collectively referred to as "parking assist control". This type of parking assist control is well-known, and thus a detailed description thereof will be omitted. It should be noted that the "control for automatically parking the vehicle in the parking position" is performed by the VCECU performing following controls; the driving force automatic control, the braking force automatic control, the steered angle automatic control, and shift position automatic control (this will be described in detail in a second embodiment). The "control for assisting in parking the vehicle in the parking position" will be performed by the VCECU performing at least one of the aforementioned four types of automatic controls and having the driver perform the rest of driving operation (for example, the operation of the shift lever 72).

Besides, parking assist control according to a following method may be performed instead of the parking assist control mentioned above. That is, the driver of the vehicle SV may register in advance in the VCECU a "position where the driver is planning on parking the vehicle SV" as a registered parking position (a second parking position). The VCECU thereafter may calculate the registered parking position based on the captured image and perform parking assist control for parking the vehicle SV in the registered parking position calculated.

<Operation>

When the parking assist control is being performed in a normal manner, the VCECU displays on the touch panel display 22 an instruction to shift a position of the shift lever 72 to "P" as well as notifies the driver with the speaker 23. When it is determined via the shift ECU 70 that the position of the shift lever 72 is shifted to "P" the VCECU finishes the parking assist control. That is, the shift lever 72 is an apparatus requested to be operated by the driver in order to stop the vehicle SV and thereby finish the parking assist control when the parking assist control is being performed in a normal manner (hereinafter, may be also referred to as "under a normal state").

On the other hand, when it is determined that there is a malfunction in a related apparatus used for the parking assist control, or when it is determined that the driver requests the discontinuation of the parking assist control, the VCECU firstly performs the driving force automatic control and the braking force automatic control and thereby stops the vehicle SV. The VCECU thereafter requests the driver to operate an apparatus different from the "apparatus (the shift lever 72) which the VCECU requests the driver to operate under a normal state" (Hereinafter, this apparatus will be simply referred to as an "apparatus different from an apparatus under a normal state"). In the present embodiment, the brake pedal 42 is adopted as the "apparatus different from the apparatus under a normal state". The VCECU determines whether or not it is possible to stop the vehicle SV by operating the "apparatus different from the apparatus under a normal state" based on a detection result of an apparatus (the master cylinder pressure sensor 41 in the present embodiment) for detecting whether or not the operation of the "apparatus different from the apparatus under a normal state" has been performed.

In the present embodiment, when it is determined that the master cylinder pressure sensor 41 has detected a value more than or equal to a predetermined determination threshold, the VCECU determines that it is possible to stop the vehicle SV by operating the brake pedal 42 and finishes the parking assist control. Hereinafter, "when it is determined that there is a malfunction in a related apparatus used for the parking assist control, or when it is determined that the driver requests the discontinuation of the parking assist control" will be simply referred to as "when the malfunction determination is made and when the control discontinuation is requested". As described above, when the malfunction determination is made and when the control discontinuation is requested, the driver is requested to operate an apparatus (the brake pedal 42) different from an apparatus (the shift lever 72) requested to be operated under a normal state, which thereby enables the driver to finish the parking assist control with easier operation than the operation under a normal state.

In this type of parking assist apparatus, a malfunction may occur in the apparatus (the master cylinder pressure sensor 41) for detecting whether or not the operation of the apparatus (the brake pedal 42) requested to be operated when the malfunction determination is made and when the control discontinuation is requested has been performed. In this case, it becomes impossible for the VCECU to determine whether or not the vehicle SV can be stopped by the operation of the brake pedal 42, ad thus there is a possibility that the parking assist control cannot be properly finished.

Therefore, in the first embodiment apparatus, when it is determined that there is a malfunction in the "apparatus for detecting whether or not the operation of the apparatus requested to be operated when the malfunction determination is made and when the control discontinuation is requested has been performed", the VCECU requests the driver to operate an apparatus different from the apparatus (the brake pedal 42) requested to be operated when the malfunction determination is made and when the control discontinuation is requested. In the present embodiment, the shift lever 72 is adopted as the "apparatus different from the apparatus requested to be operated when the malfunction determination is made and when the control discontinuation is requested". The VCECU displays on the touch panel display 22 the instruction to shift a position of the shift lever 72 to "P" as well as notifies the driver with the speaker 23 (hereinafter, simply referred to as "conduct a shift lever position P shifting instruction"). When it is determined that the position of the shift lever 72 has been shifted to "P" via the shift ECU 70, the VCECU finishes the parking assist control.

<Specific Operation>

Figure 2:
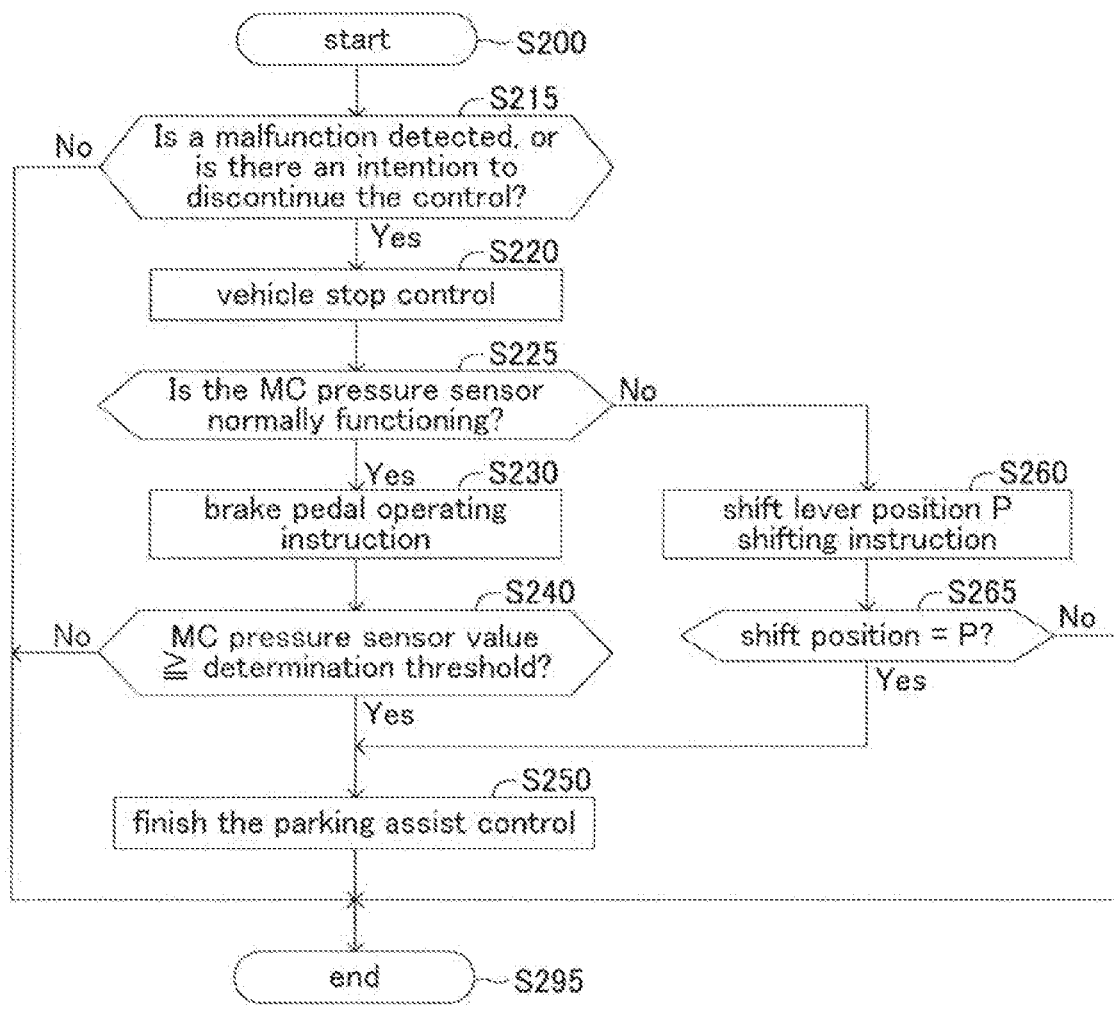
FIG. 2 is a flowchart showing a routine executed by CPU of vehicle control ECU shown in FIG. 1.

The CPU of the VCECU performs a routine shown by a flowchart in FIG. 2 every time a predetermined time elapses while the parking assist control is being performed.

When a predetermined timing arrives, the CPU initiates processing from a step 200 in FIG. 2 and proceeds to a step 215 to determine "whether or not there is a malfunction in the related apparatus used for the parking assist control, or whether or not the discontinuation of the parking assist control is being requested by the driver". When the CPU makes a "No" determination (S215: No), the CPU proceeds to a step 295 to tentatively terminate the present routine.

On the other hand, when the CPU makes an "Yes" determination at the step 215 (S215: Yes), the CPU proceeds to a step 220 and performs control for stopping the vehicle SV (that is, the driving force automatic control and the braking force automatic control) to stop the vehicle SV. Subsequently, the CPU proceeds to a step 225 and determines whether or not the master cylinder pressure sensor 41 is normally functioning. That is, the first embodiment apparatus comprises a non-illustrated sensor for detecting abnormality of the master cylinder pressure sensor 41, and the VCECU makes a determination at the step 225 based on a detection result of this sensor. When the CPU makes an "Yes" determination at the step 225 (S225: Yes), the CPU proceeds to a step 230 and displays on the touch panel display 22 an instruction to operate the brake pedal 42 as well as notifies the driver with the speaker 23 (hereinafter, simply referred to as "conduct a brake pedal operating instruction").

Next, the CPU proceeds to a step 240 and determines whether or not the master cylinder pressure sensor 41 has detected a value more than or equal to the determination threshold. When the CPU makes a "No" determination at the step 240 (S240: No), the CPU proceeds to the step 295 to tentatively terminate the present routine. The CPU repeats the processing of the step 240 until an "Yes" determination is made at the step 240. When the CPU makes an "Yes" determination (S240: Yes), the CPU determines that the vehicle SV can be stopped by the operation of the brake pedal 42 and proceeds to a step 250 to finish the parking assist control. Thereafter, the CPU proceeds to the step 295 to tentatively terminate the present routine.

In contrast, when the CPU makes a "No" determination at the step 225 (S225: No), the CPU proceeds to a step 260 and conducts the shift lever position P shifting instruction. Subsequently, the CPU proceeds to a step 265 and determines whether or not a shift position is P. When the CPU makes a "No" determination (S265: No), the CPU proceeds to the step 295 to tentatively terminate the present routine. The CPU repeats the processing of the step 265 until an "Yes" determination is made at the step 265. When the CPU makes an "Yes" determination (S265: Yes), the CPU determines that the vehicle SV can be stopped by the operation of the shift lever 72 and proceeds to the step 250 to finish the parking assist control. Thereafter, the CPU proceeds to the step 295 to tentatively terminate the present routine.

Effects of the first embodiment apparatus will be explained. In the first embodiment apparatus, when the malfunction determination is made and when the control discontinuation is requested, the brake pedal 42 is operated by the driver and thereby the parking assist control is finished (discontinued). However, when it is determined that there is a malfunction in the master cylinder pressure sensor 41 which is an apparatus for detecting whether or not the operation of the brake pedal 42 has been performed, the shifting operation of a position of the shift lever 72 to "P" is performed by the driver and thereby the parking assist control is finished. That is, the shift lever 72 functions as an alternative apparatus for stopping the vehicle SV when there is a malfunction in the master cylinder pressure sensor 41. Therefore, even though a malfunction occurs in the master cylinder pressure sensor 41, the shift lever 72 serving as an alternative apparatus is operated and thereby the parking assist control can be properly finished.

In addition, in the first embodiment apparatus, in a case where it is determined that there is a malfunction in the master cylinder pressure sensor 41 when the malfunction determination is made and when the control discontinuation is requested, the driver is given a shift lever position P shifting instruction. Therefore, it becomes possible to properly notify the driver of what kind of operation is requested in order to finish the parking assist control.

It should be noted that in the first embodiment, the master cylinder pressure sensor 41 is adopted as an apparatus for detecting whether or not the operation of the brake pedal 42 has been performed. However, a stroke sensor or a stop lamp sensor may be adopted instead of the master cylinder pressure sensor 41, the stroke sensor being for detecting an operation amount of the brake pedal 42 and the stop lamp sensor being for detecting a lighting state of a stop lamp which is lightened when the brake pedal 42 is pedaled. Same thing can be said to following embodiments and a modification example.

Besides, in the first embodiment, the shift lever 72 is adopted as an alternative apparatus for stopping the vehicle SV when there is a malfunction in the master cylinder pressure sensor 41. However, the parking brake lever 101 may be adopted instead of the shift lever 72. That is, when the CPU makes a "No" determination at the step 225, the VCECU may display on the touch panel display 22 an instruction to operate the parking brake lever 101 as well as notify the driver with the speaker 23, determine at the step 265 a detection result of the parking brake sensor, and thereby finish the parking assist control.

Second Embodiment

Figure 3:
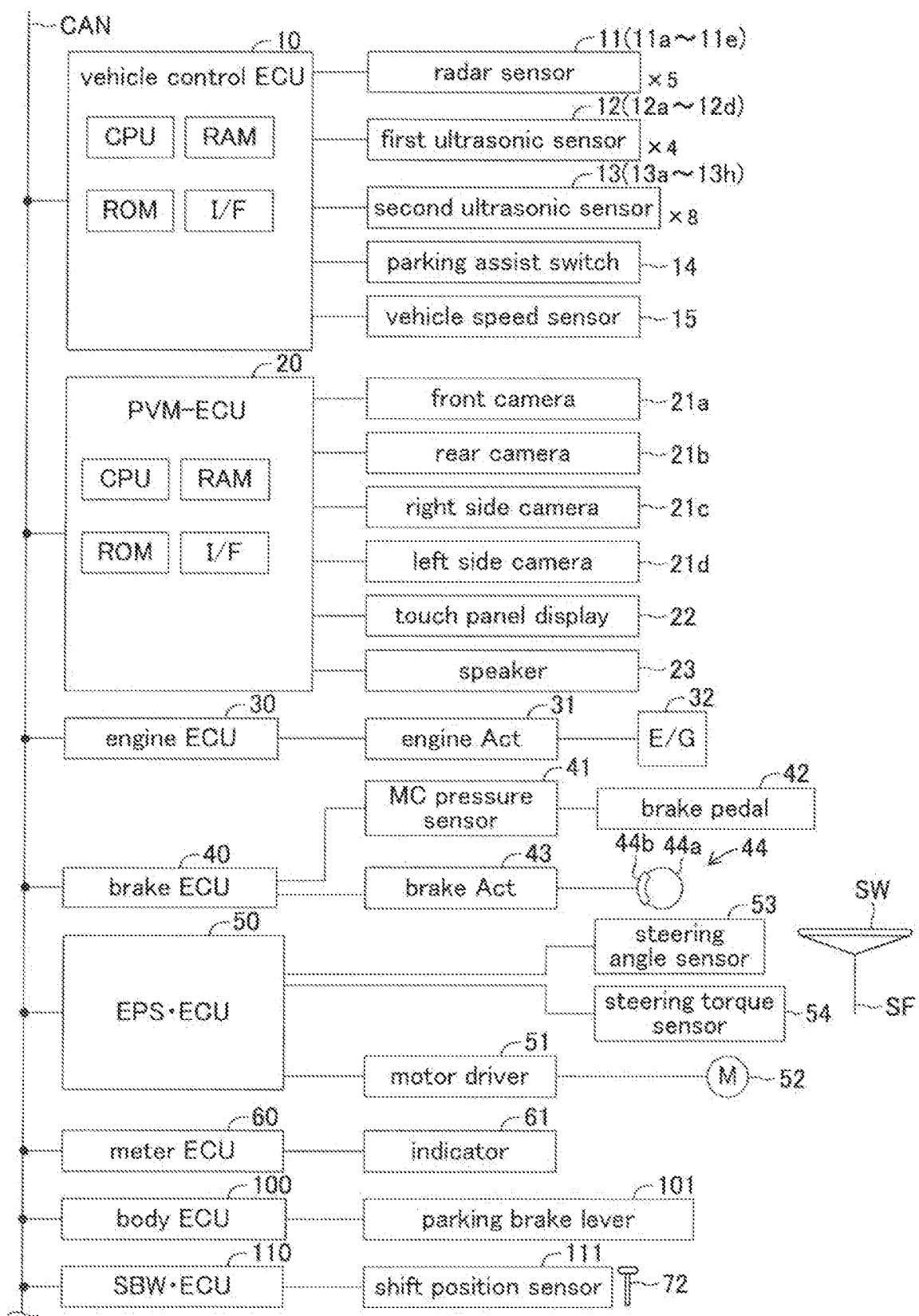
FIG. 3 is a schematic configuration diagram of a parking assist apparatus according to a second embodiment of the present invention.

A parking assist apparatus (hereinafter, referred to as a "second embodiment apparatus") according to a second embodiment of the present invention will be described below, referring to FIG. 3 and FIG. 4. Here, differences from the first embodiment will be mainly described.
<Configuration>

The second embodiment apparatus comprises SBW (Shift-by-Wire)•ECU 110 instead of the shift ECU 70. The SBW•ECU 110 is connected to a shift position sensor 111. The shift position sensor 111 detects a position of the shift lever 72 serving as the movable part of the shift operation part. The SBW•ECU 110 is configured to receive a position of the shift lever 72 from the shift position sensor 111 and control, based on the position received, the non-illustrated transmission and/or the driving direction shifting mechanism of the vehicle SV (that is, perform the shift control of the vehicle SV).

The VCECU can transmit a shifting instruction to the SBW•ECU 110. When having received the shifting instruction, the SBW•ECU 110 can, in response to this shifting instruction, control the transmission and/or the driving direction shifting mechanism without relying on the operation of the shift lever 72 by the driver and thereby can shift a position of the shift lever 72. This control of the transmission and/or the driving direction shifting mechanism based on the shifting instruction transmitted from the VCECU will be referred to as "shift position automatic control".
<Operation>

In the second embodiment, the shift lever 72 is adopted as the "apparatus different from the apparatus under a normal state". Therefore, when the malfunction determination is made and when the control discontinuation is requested, the VCECU performs the driving force automatic control and the braking force automatic control, and stops the vehicle SV. Thereafter, the VCECU performs the shift position automatic control for shifting a position of the shift lever 72 to "P" via the SBW•ECU 110 and thereby finishes the parking assist control. On the other hand, when it is determined that there is a malfunction in an SBW related apparatus (the SBW•ECU 110 and the shift position sensor 111) which is an "apparatus for detecting whether or not operation of an apparatus (the shift lever 72) controlled by the VCECU when the malfunction determination is made and when the control discontinuation is requested has been performed", the VCECU requests the driver to operate an apparatus different from the shift lever 72. In the present embodiment, the brake pedal 42 is adopted as an "apparatus different from an apparatus controlled by the VCECU when the malfunction determination is made and when the control discontinuation is requested". The VCECU conducts the brake pedal operating instruction and when it is determined that the master cylinder pressure sensor 41 has detected a value more than or equal to the determination threshold, the VCECU finishes the parking assist control.
<Specific Operation>

Figure 4:
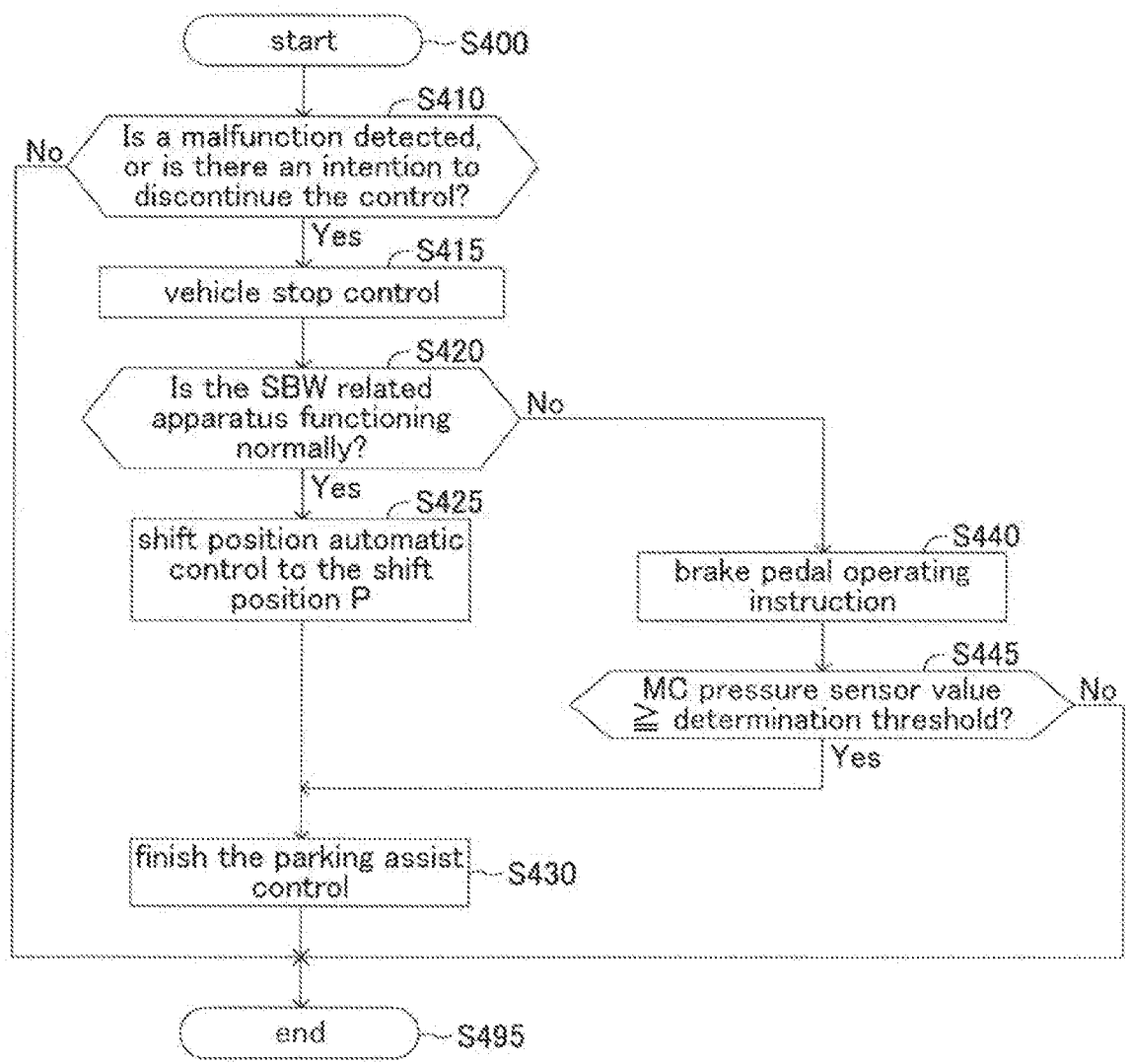
FIG. 4 is a flowchart showing a routine executed by CPU of vehicle control ECU shown in FIG. 3.

When a predetermined timing arrives, the CPU initiates processing from a step 400 in FIG. 4 and proceeds to a step 410 to determine "whether or not there is a malfunction in the related apparatus used for the parking assist control, or whether or not the discontinuation of the parking assist control is being requested by the driver", When the CPU makes a "No" determination (S410: No), the CPU proceeds to a step 495 to tentatively terminate the present routine.

On the other hand, when the CPU makes an "Yes" determination at the step 410 (S410: Yes), the CPU proceeds to a step 415 and performs the control for stopping the vehicle SV (that is, the driving force automatic control and the braking force automatic control) to stop the vehicle SV. Subsequently, the CPU proceeds to a step 420 and determines whether or not the SBW related apparatus is normally functioning. That is, the second embodiment apparatus comprises a non-illustrated sensor for detecting abnormality of the SBW related apparatus, and the VCECU makes a determination at the step 420 based on a detection result of this sensor. When the CPU makes an "Yes" determination at the step 420 (S420: Yes), the CPU proceeds to a step 425 and performs the shift position automatic control for shifting a position of the shift lever 72 to "P". Thereafter, the CPU proceeds to a step 430 to finish the parking assist control and at the step 495, tentatively terminate the present routine.

In contrast, when the CPU makes a "No" determination at the step 420 (S420: No), the CPU proceeds to a step 440 and conducts the brake pedal operating instruction to the driver. Thereafter, the CPU proceeds to a step 445 and determines whether or not the master cylinder pressure sensor 41 has detected a value more than or equal to the determination threshold. When the CPU makes a "No" determination (S445: No), the CPU proceeds to the step 495 and tentatively terminate the present routine. The CPU repeats the processing of the step 445 until an "Yes" determination is made at the step 445. When the CPU makes an "Yes" determination (S445: Yes), the CPU proceeds to the step 430 to finish the parking assist control, and tentatively terminate the present routine at the step 495.

According to the configuration above, same effects as the first embodiment apparatus can be obtained. Especially, the second embodiment apparatus makes it possible to safely transfer initiative of the parking operation from the VCECU (controller) to the driver.

Modification Example

Figure 5:
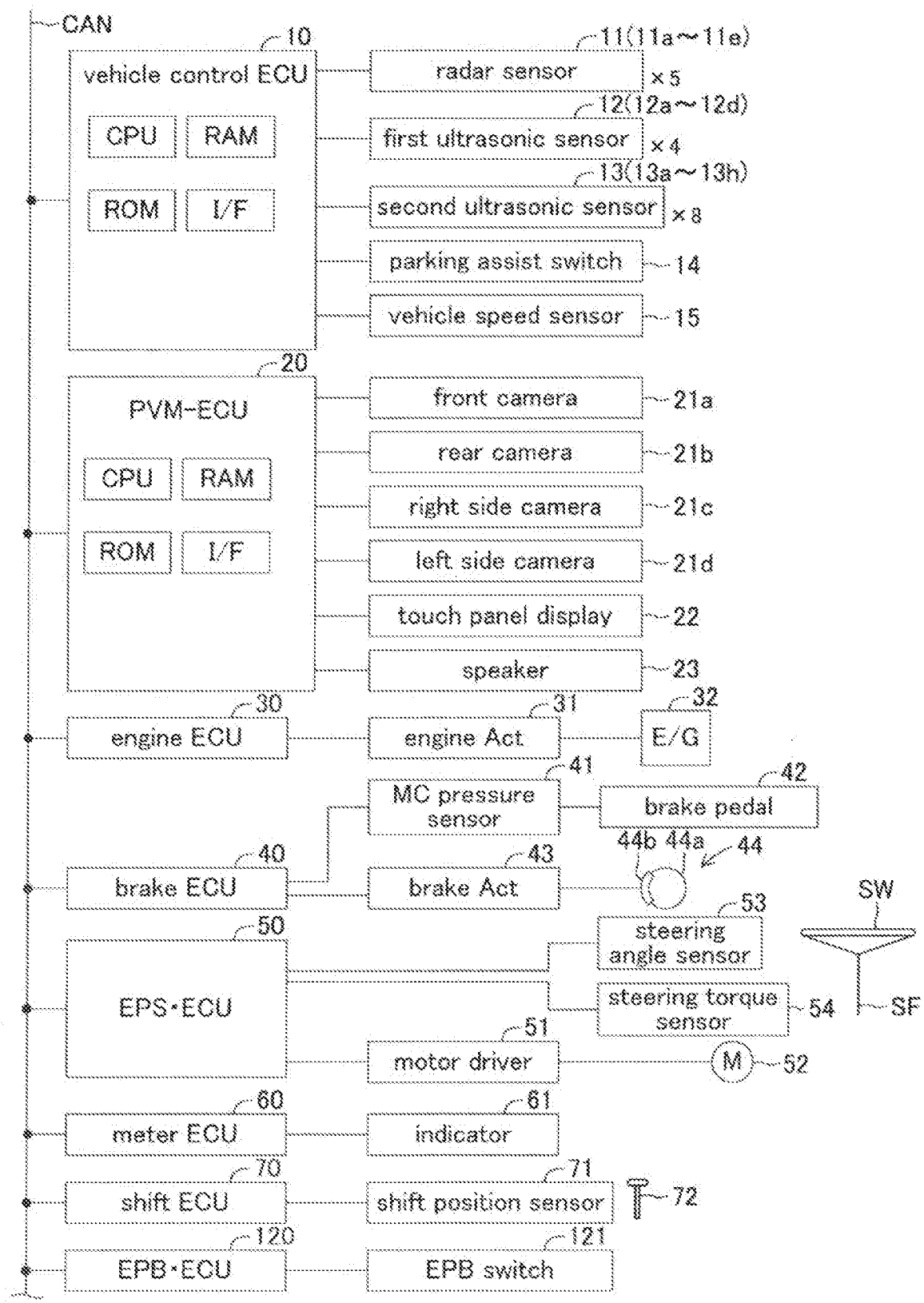
FIG. 5 is a schematic configuration diagram of a parking assist apparatus according to a modification example of a second embodiment of the present invention.
Figure 6:
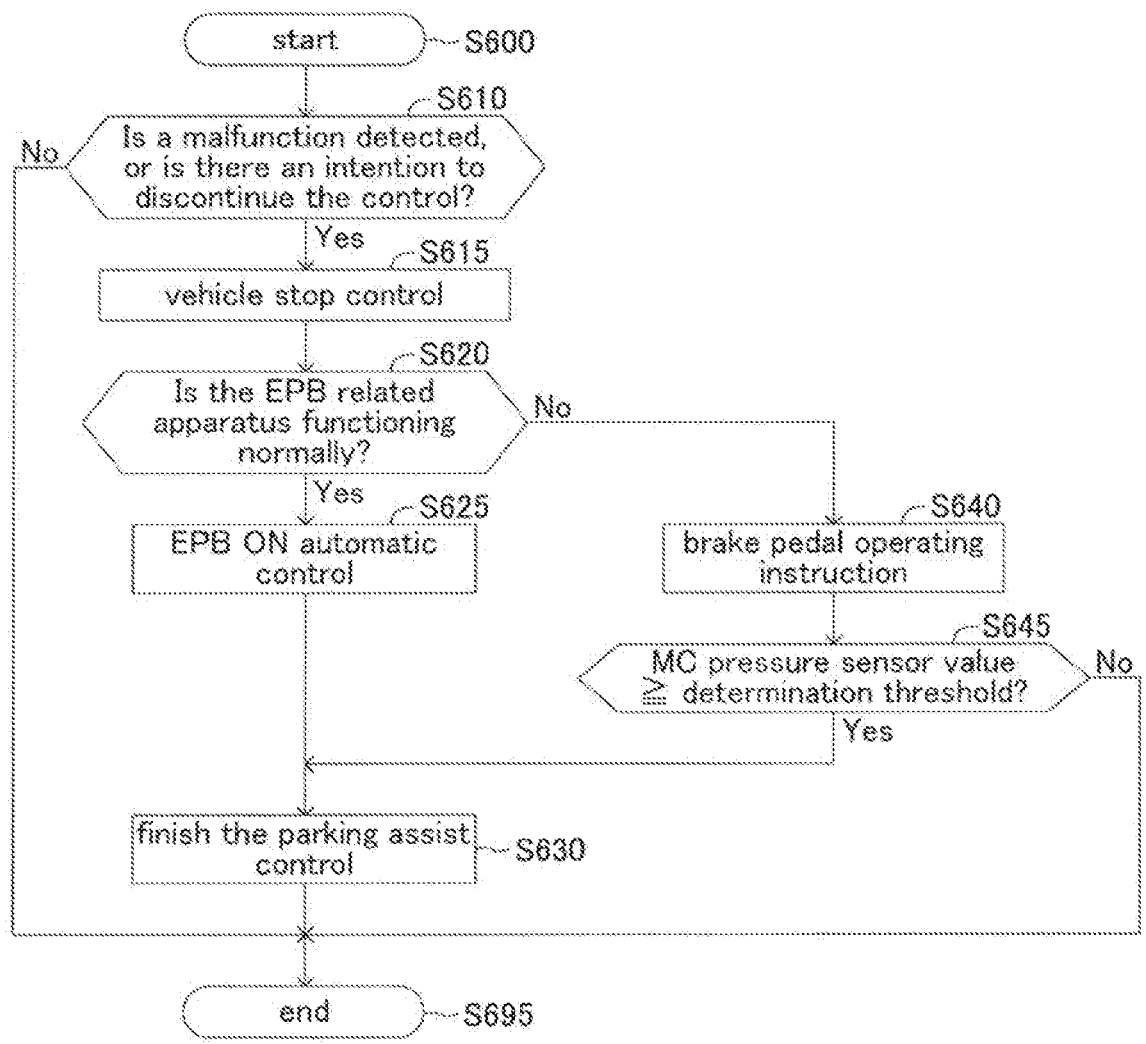
FIG. 6 is a flowchart showing a routine executed by CPU of vehicle control ECU shown in FIG. 5.

A parking assist apparatus (hereinafter, referred to as a "second modification apparatus") according to a modification example of the second embodiment of the present invention will be described below, referring to FIG. 5 and FIG. 6. Here, differences from the second embodiment will be mainly described.
<Configuration>

The second modification apparatus comprises the shift ECU 70 and the shift position sensor 71 connected thereto instead of the SBW•ECU 110. In addition, the second modification apparatus comprises EPB•ECU 120 instead of the body ECU 100.

An EPB switch 121 is connected to the EPB•ECU 120. The EPB switch 121 is connected to a non-illustrated EPB sensor. This EPB sensor detects an operating state of the EPB switch 121 and transmits a detection result to the EPB•ECU 120. The EPB switch 121 can be operated by the driver as well as the operating state thereof can be switched by the EPB•ECU 120 (described later). When it is determined, based on the detection result of the EPB sensor, that the EPB switch 121 is in an ON state, the EPB•ECU 120 performs control for electrically locking the rear wheels of the vehicle SV. When it is determined that the EPB switch 121 has been switched from the On state to an OFF state, the EPB•ECU 120 unlocks the rear wheels.

The VCECU can transmit an EPB instruction to the EPB•ECU 120. When having received the EPB instruction, the EPB•ECU 120 can, in response to this EPB instruction, switch the operating state of the EPB switch 121 without relying on the operation of the EPB switch 121 by the driver and thereby can perform the control for electrically locking the rear wheels of the vehicle SV. This locking control of the rear wheels based on the EPB instruction transmitted from the VCECU will be referred to as "EPB ON automatic control".
<Operation>

In the modification example, the EPB switch 121 is adopted as the "apparatus different from the apparatus under a normal state". Therefore, when the malfunction determination is made and when the control discontinuation is requested, the VCECU performs the driving force automatic control and the braking force automatic control, and stops the vehicle SV. Thereafter, the VCECU performs the EPB ON automatic control for switching the operating state of the EPB switch 121 to the ON state via the EPB•ECU 120 and thereby finishes the parking assist control. On the other hand, when it is determined that there is a malfunction in an EPB related apparatus (the EPB•ECU 120 and the EPB sensor) which is an "apparatus for detecting whether or not operation of an apparatus (the EPB switch 121) controlled by the VCECU when the malfunction determination is made and when the control discontinuation is requested has been performed", the VCECU requests the driver to operate an apparatus (the brake pedal 42 which is the same apparatus adopted in the second embodiment) different from the EPB switch 121. When it is determined that the master cylinder pressure sensor 41 has detected a value more than or equal to the determination threshold, the VCECU finishes the parking assist control.
<Specific Operation>

In the modification example, a routine where the step 420 and the step 425 in the second embodiment are respectively replaced with a step 620 and a step 625 is performed.

At the step 620, the CPU determines whether or not the EPB related apparatus is normally functioning. That is, the second modification apparatus comprises a non-illustrated sensor for detecting abnormality of the EPB related apparatus, and the VCECU makes a determination at the step 620 based on a detection result of this sensor.

At the step 625, the CPU performs the EPB ON automatic control.

According to the configuration above, same effects as the second embodiment apparatus can be obtained.

Third Embodiment

Figure 7:
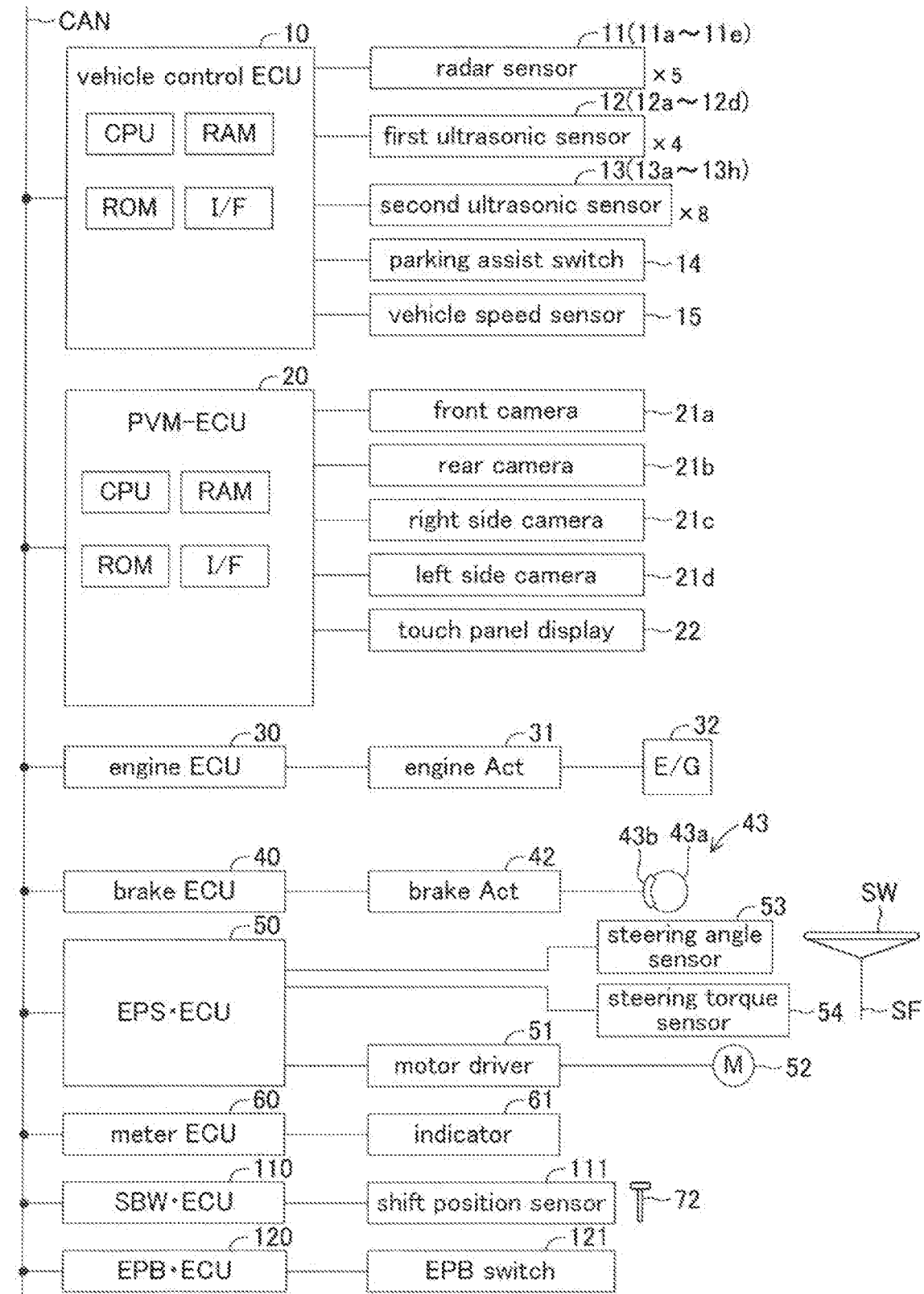
FIG. 7 is a schematic configuration diagram of a parking assist apparatus according to a third embodiment of the present invention.
Figure 8:
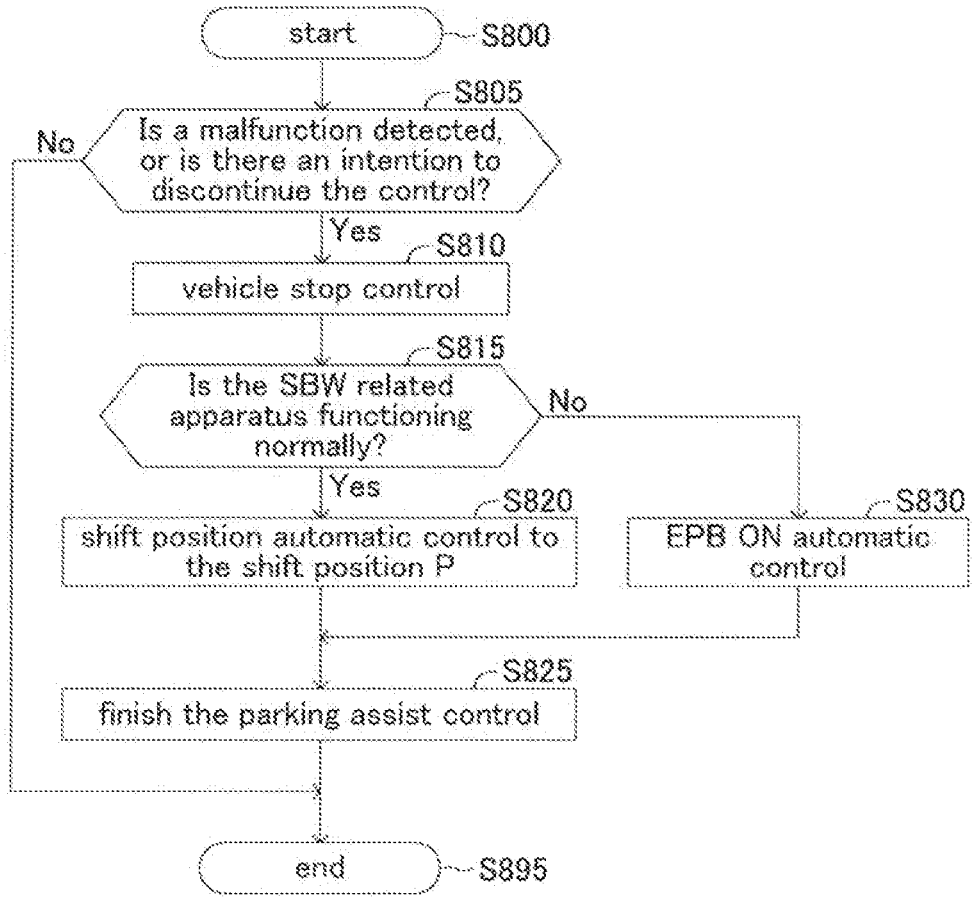
FIG. 8 is a flowchart showing a routine executed by CPU of vehicle control ECU shown in FIG. 7.

A parking assist apparatus (hereinafter, referred to as a "third embodiment apparatus") according to a third embodiment of the present invention will be described below, referring to FIG. 7 and FIG. 8. Here, differences from the second embodiment will be mainly described.
<Configuration>

The third embodiment apparatus comprises the EPB•ECU 120 and the EPB switch 121 connected thereto instead of the body ECU 100.
<Operation>

An "apparatus different from the apparatus under a normal state" in the third embodiment is the same as the apparatus in the second embodiment. On the other hand, when it is determined that there is a malfunction in the SBW related apparatus (the SBW•ECU 110 and the shift position sensor 111) which is the "apparatus for detecting whether or not the operation of an apparatus (the shift lever 72) controlled by the VCECU when the malfunction determination is made and when the control discontinuation is requested has been performed", the VCECU controls an apparatus different from the shift lever 72. In the third embodiment, the EBP switch 121 is adopted as an "apparatus different from the shift lever 72". The VCECU performs the EPB ON automatic control via the EPB•ECU 120 and thereby stops the vehicle SV. Thereafter, the VCECU finishes the parking assist control.
<Specific Operation>

In the third embodiment, a routine where the step 440 in the second embodiment is replaced with a step 830 and a determination at the step 445 is not made is performed.

At the step 830, the CPU performs the EPB ON automatic control. Thereafter, the CPU proceeds to a step 825 to finish the parking assist control.

According to the configuration above, same effects as the second embodiment apparatus can be obtained (However, the effect on the initiative of the parking operation is excluded).

The parking assist apparatus according to the embodiments and the modification example of the present invention have been described. However, the present invention is not limited thereto and may adopt various modifications within a scope of the present invention.

For example, a "configuration where the driver operates or the VCECU controls an apparatus different from an "apparatus operated to stop the vehicle SV" when there is a malfunction in an apparatus for detecting whether or not the operation of the "apparatus operated to stop the vehicle SV" has been performed and thereby the parking assist control is finished" may be applied to a case where the parking assist control is being performed in a normal manner.

In addition, in the second and third embodiments, the brake pedal 42 is adopted as the "apparatus different from the apparatus requested to be operated when the malfunction determination is made and when the control discontinuation is requested". However, either one of the parking brake lever 101 or the shift lever 72 may be adopted instead of the brake pedal 42.

Further, in the third embodiment, the EPB ON automatic control is performed when the CPU makes a "No" determination at the step 815. In this case, in order to manage a case where a malfunction also occurs in the EPB related apparatus, when the "No" determination is made at the step 815, an additional determination of whether or not the EPB related apparatus is functioning normally may be made. When the CPU makes a "No" determination at this determination, the CPU may perform additional control for instructing the driver to operate either one of the brake pedal 42, the shift lever 72, or the parking brake lever 101.

The invention claimed is:

1. A parking assist apparatus comprising:
   an imaging apparatus for taking an image of a surrounding of a vehicle;
   a first vehicle stop apparatus configured to be operated for a purpose of stopping said vehicle;
   a controller configured to:
      be capable of performing at least one of following controls as parking assist control, one control being for automatically parking said vehicle in a first parking position or in a second parking position, said first parking position being set on a region where parking is determined to be possible based on at least a captured image taken by said imaging apparatus, and said second parking position being registered in advance using said captured image, and an other control being for assisting in parking said vehicle in said first parking position or in said second parking position, and
      finish said parking assist control by performing control for instructing a driver of said vehicle to operate said first vehicle stop apparatus or by controlling said first vehicle stop apparatus; and
   a second vehicle stop apparatus different from said first vehicle stop apparatus configured to be operated for a purpose of stopping said vehicle,
   wherein,
   when it is determined while said parking assist control is being performed that there is a malfunction in an apparatus for detecting whether or not operation of said first vehicle stop apparatus has been performed, said controller is configured to finish said parking assist control by performing control for instructing said driver to operate said second vehicle stop apparatus or by controlling said second vehicle stop apparatus.

2. The parking assist apparatus according to claim 1, wherein,
   when it is determined while said parking assist control is being performed that there is a malfunction in a related apparatus used for said parking assist control, said controller is configured to finish said parking assist control by performing control for instructing said driver to operate said first vehicle stop apparatus or by controlling said first vehicle stop apparatus.

* * * * *